(12) United States Patent
Farley et al.

(10) Patent No.: US 9,893,591 B2
(45) Date of Patent: Feb. 13, 2018

(54) LUBRICANT FLOW CONTROL IN A LINEAR MOTOR

(71) Applicant: Stratasys, Inc., Eden Prairie, MN (US)

(72) Inventors: Joel Farley, Mendota Heights, MN (US); James Flannigan, Roseville, MN (US)

(73) Assignee: Stratasys, Inc., Eden Prairie, MN (US)

( * ) Notice: Subject to any disclaimer, the term of this patent is extended or adjusted under 35 U.S.C. 154(b) by 266 days.

(21) Appl. No.: 14/955,875

(22) Filed: Dec. 1, 2015

(65) Prior Publication Data

US 2017/0155304 A1   Jun. 1, 2017

(51) Int. Cl.
 *H02K 7/06* (2006.01)
 *F16H 25/20* (2006.01)
 *F16H 57/04* (2010.01)

(52) U.S. Cl.
 CPC ............... *H02K 7/06* (2013.01); *F16H 25/20* (2013.01); *F16H 57/042* (2013.01); *F16H 57/0497* (2013.01); *F16H 2025/2075* (2013.01); *H02K 2213/03* (2013.01)

(58) Field of Classification Search
 CPC ......... H02K 41/00–41/065; H02K 7/06; F16H 25/20–25/2056; F16H 2025/2028–2025/2096
 USPC .......................... 310/20, 37, 80, 12.01–12.33
 See application file for complete search history.

(56) References Cited

U.S. PATENT DOCUMENTS

| | | | |
|---|---|---|---|
| 7,374,712 B2 | 5/2008 | Swanson et al. | |
| 7,938,356 B2 | 5/2011 | Taatjes et al. | |
| 8,196,484 B2 | 6/2012 | Holker et al. | |
| 2004/0061382 A1* | 4/2004 | Schreier | F16H 25/20 310/13 |
| 2009/0049938 A1* | 2/2009 | Teramachi | F16H 25/2204 74/22 A |
| 2013/0161432 A1 | 6/2013 | Mannella et al. | |
| 2013/0161442 A1 | 6/2013 | Mannella et al. | |
| 2014/0158802 A1 | 6/2014 | Batchelder et al. | |
| 2015/0097455 A1* | 4/2015 | Ueyama | H02K 7/06 310/80 |

* cited by examiner

*Primary Examiner* — Thomas Truong
(74) *Attorney, Agent, or Firm* — Peter J. Ims; Westman, Champlin & Koehler, P.A.

(57) ABSTRACT

A linear motor includes a rotor rotatable relative to a surrounding rotor sleeve and about a central axis. At least one opening extends between an inner surface and an outer surface of the rotor. An externally threaded leadscrew extends through the rotor and along the central axis. An internally threaded nut is located within and mated to the rotor so as to rotate with the rotor about the central axis and ride along the leadscrew. A first cavity is located between the nut and a first bushing set against the inner surface of the rotor and a second cavity is located between nut and a second bushing set against the inner surface of the rotor. The at least one opening in the rotor forms a passage between the first and second cavities and is defined between the sleeve and nut so as to communicate excess lubricant.

20 Claims, 8 Drawing Sheets

LUBRICANT FLOW CONTROL IN A LINEAR MOTOR

BACKGROUND

Linear actuators or motors create motion in a straight line and are used in industrial machinery and manufacturing. Many electro-mechanical linear actuators include a leadscrew and a lead nut. Together the leadscrew and the lead nut translate the turning motion of a rotor into linear motion.

One example of an electro-mechanical linear actuator is a traveling-nut linear actuator where a rotor rotates a leadscrew and a lead nut is restrained from spinning so the lead nut travels up and down the leadscrew using the principle operation of an inclined plane as provided by the threads of the spinning leadscrew. Another example of an electro-mechanical linear actuator is a traveling-screw linear actuator where a retrained leadscrew passes entirely through a motor and the motor, which contains a lead nut, "crawls" up and down the restrained leadscrew. In this example, the only spinning components are inside the motor and are not visible from the outside.

SUMMARY

An aspect of the present disclosure includes a linear motor that has a hollow rotor where the hollow rotor is rotatable about a central axis and rotatable relative to a surrounding rotor sleeve. The hollow rotor includes a first open end, a second open end and at least one opening extending between an inner surface of the hollow rotor and an outer surface of the hollow rotor. An externally threaded leadscrew extends through the first open end and the second open end of the hollow rotor and along the central axis. An internally threaded nut has a first open end and a second open end and is located within and mated to the hollow rotor so as to rotate with the hollow rotor about the central axis. The internally threaded nut is positioned about and configured to ride along the externally threaded leadscrew. A first cavity is located between the first open end of the internally threaded nut and a first bushing set against the inner surface of the rotor. A second cavity is located between the second open end of the internally threaded nut and a second bushing set against the inner surface of the rotor. The at least one opening in the hollow rotor forms a passage between the first cavity and the second cavity and the passage is defined between the sleeve and the internally threaded nut so as to cause excess lubricant to flow from a high pressure zone to a low pressure zone through the passage.

In another aspect of the present disclosure, a linear motor includes a rotor sleeve, a rotor, an externally threaded leadscrew, an actuator nut, a first rotor guide bushing and a second rotor guide bushing. The rotor is surrounded by the rotor sleeve and extends along and is rotatable about a central axis. The rotor includes an outer surface, an inner surface, a first open end and a second open end. The externally threaded leadscrew extends through an inside of the rotor and along the central axis. The actuator nut has a first open end and a second open end and is fixed to and contained within the inside of the rotor between the first open end and the second open end of the rotor. The actuator nut includes internal threads that ride along the external threads of the leadscrew upon rotation of the rotor. The first rotor guide bushing is set against the inner surface of the rotor and creates a lubricant seal between the rotor and the leadscrew. The first rotor guide bushing is spaced apart from the first open end of the actuator nut by a distance that forms a first lubricant chamber. The second rotor guide bushing is set against the inner surface of the rotor and creates a lubricant seal between the rotor and the leadscrew. The second rotor guide bushing is spaced apart from the second open end of the actuator nut by a distance that forms a second lubricant chamber. At least one bypass channel is located in the rotor and has a portion that extends through a thickness of the rotor. The at least one bypass channel is defined between the rotor sleeve and the actuator nut and includes a first port that is in communication with the first lubricant chamber and a second port that is in communication with the second lubricant chamber so as to allow excess lubricant to travel from a high pressure zone in one of the first and second lubricant chambers to a low pressure zone in the other one of the first and second lubricant chambers.

In yet another aspect of the present disclosure, a method of reducing friction caused by the viscosity of lubricant in a linear motor is provided. A linear motor is electrically powered to rotate a rotor that surrounds an internally threaded nut that fixedly mates with the rotor. By rotating the rotor the internally threaded nut rides on an externally threaded leadscrew that extends along a central axis through the internally threaded nut and the rotatable rotor. Lubricant is communicated between a first chamber in the rotor that is defined between a first bushing located at and sealed to a first open end of the rotor and a first end of the internally threaded nut and a second chamber in the rotor that is defined between a second bushing located at and sealed to a second end of the internally threaded nut using at least one bypass channel extending through a thickness of the rotor and defined between a sleeve surrounding the rotor and an outer surface of the internally threaded nut.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Described herein are embodiments of an electro-mechanical linear motor or actuator for use in various industrial and manufacturing applications. In particular, embodiments are to a traveling-screw linear motor or actuator. Over the course of the life of the linear actuator, lubricant applied to the leadscrew is pushed toward the limits of travel by the interfacing lead nut. This can bring about pre-mature wear, vibration and high friction in the linear motor actuator due to the loss of lubrication between the limits of travel. The embodiments described below include a bypass channel formed in the rotor. The bypass channel provides a path for excess lubricant to travel from the high pressure zone to a low pressure zone and reduces friction caused by the viscosity of the lubricant.

One exemplary manufacturing application for an electro-mechanical linear motor or actuator of the traveling-screw type is in driving a gantry of an additive manufacturing systems, which are used to print or otherwise build 3D parts from digital representations of the 3D parts (e.g., AMF and STL form at files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the 3D part is initially sliced into multiple layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in substantially planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

Figure 1:
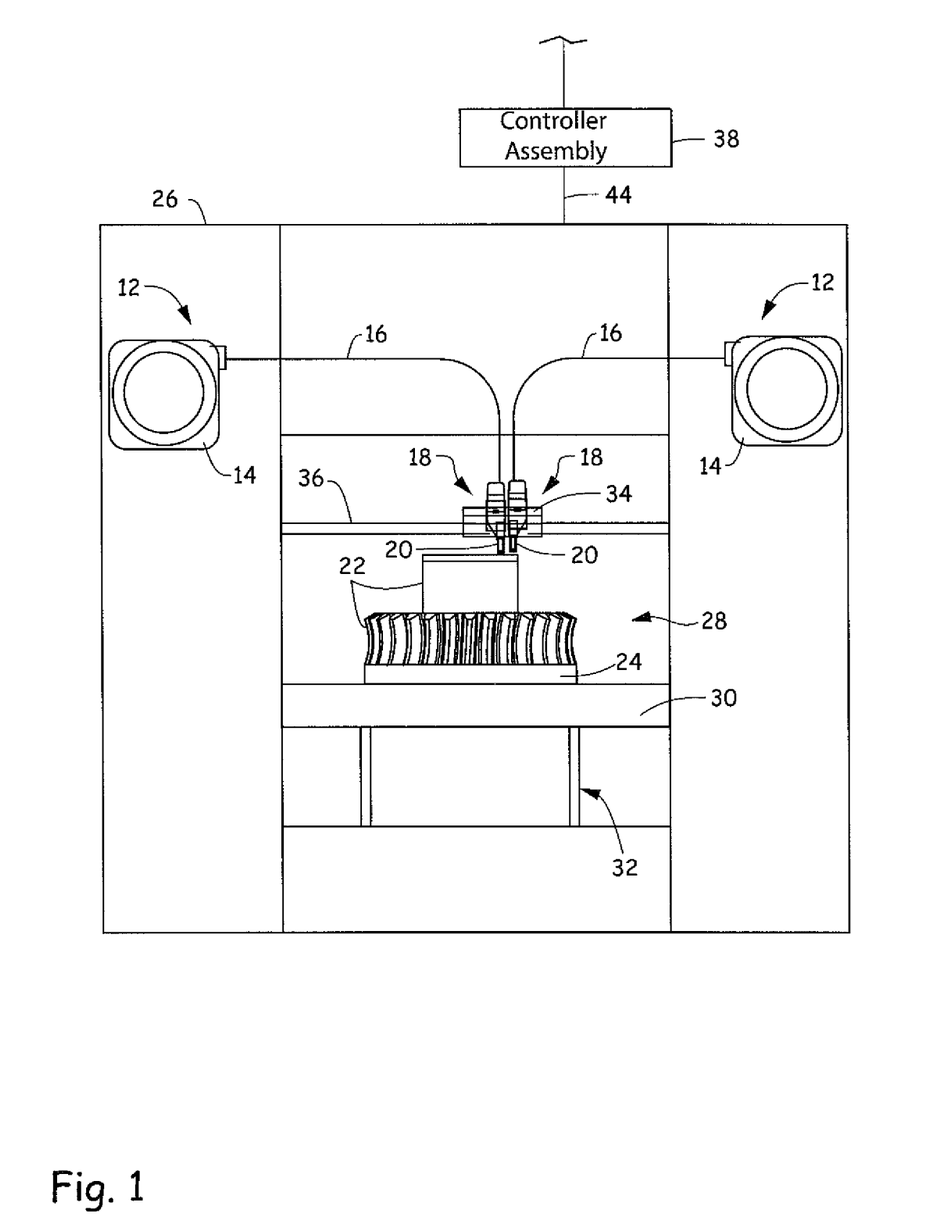
FIG. 1 is a front view of an additive manufacturing system configured to printing 3D parts and support structures using at least one linear motor as described in the present disclosure.

For example, FIG. 1 shows additive manufacturing system 10 in use with two consumable assemblies 12, where each consumable assembly 12 includes an easily loadable, removable, and replaceable container device 14 that retains a supply of a consumable filament for printing with system 10 and a guide tube 16. Typically, one of the consumable assemblies 12 contains a part material filament, and the other consumable assembly 12 contains a support material filament. However, both consumable assemblies 12 may be identical in structure. Each consumable assembly 12 may retain the consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Publication Nos. 2013/0161432 and 2013/0161442; and Batchelder et al., U.S. Publication No. 2014/0158802.

Guide tube 16 interconnects container portion 14 and print head 18, where a drive mechanism of print head 18 (or of system 10) draws successive segments of the consumable filament from container portion 14, through guide tube 16, to liquefier assembly 20 of print head 18. In this embodiment, guide tube 16 may be a component of system 10, rather than a sub-component of consumable assemblies 12. In other embodiments, guide tube 16 is a sub-component of consumable assembly 12, and may be interchanged to and from system 10 with each consumable assembly 12.

Exemplary system 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn. under the trademark "FDM."

As shown, system 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive container portions 14 of consumable assemblies 12. In alternative embodiments, the container bays may be omitted to reduce the overall footprint of system 10. In these embodiments, container portions 14 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. Platen gantry 32 is a gantry assembly configured to move platen 30 along (or substantially along) the vertical z-axis.

Head carriage 34 is a unit configured to receive and retain one or both print heads 18, and is supported by head gantry 36. Head carriage 34 preferably retains each print head 18 in a manner that prevents or restricts movement of the print head 18 relative to head carriage 34 in the x-y build plane, but allows the print head 18 to be controllably moved out of the x-y build plane (e.g., servoed, toggled, or otherwise switched in a pivoting manner). Head carriage 34 also decreases the likelihood of binding while moving on the head gantry 36. When in active or extruding state, print head 18 is secured in each of the x, y and z planes as well as preventing pitch, roll and yaw relative to the head carriage 34. When in passive or non-extruding state, print head 18 is moved through the z plane in an arcuate path by changing pitch of print head 18. In further embodiments, print heads 18 and corresponding head carriage 34 may optionally be retrofitted into an existing system 10.

In an alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of system 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of system 10. While illustrated as a single signal line, communication line 44 may include one or more electrical, optical, and/or wireless signal lines, which may be external and/or internal to system 10, allowing controller assembly 38 to communicate with various components of system 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively draw successive segments of the consumable filaments from container portions 14 and through guide tubes 16, respectively.

Whatever additive manufacturing system is utilized, the disclosed linear motor can be incorporated into a gantry such as platen gantry 32 or head gantry 36, to move components such as platen 30 or move head carriage 34 in any of x, y and z directions.

Figure 2:
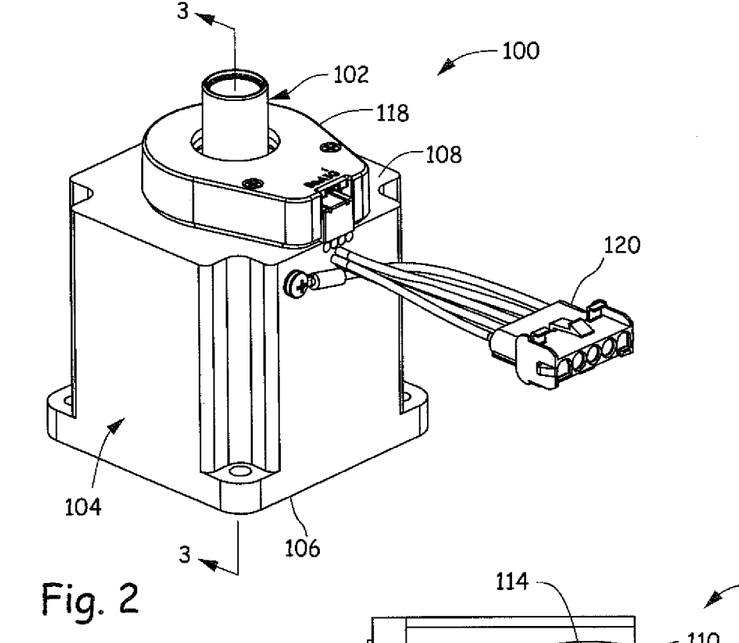
FIG. 2 is a perspective view of a portion of a linear motor having lubricant flow control according to one embodiment.
Figure 3:
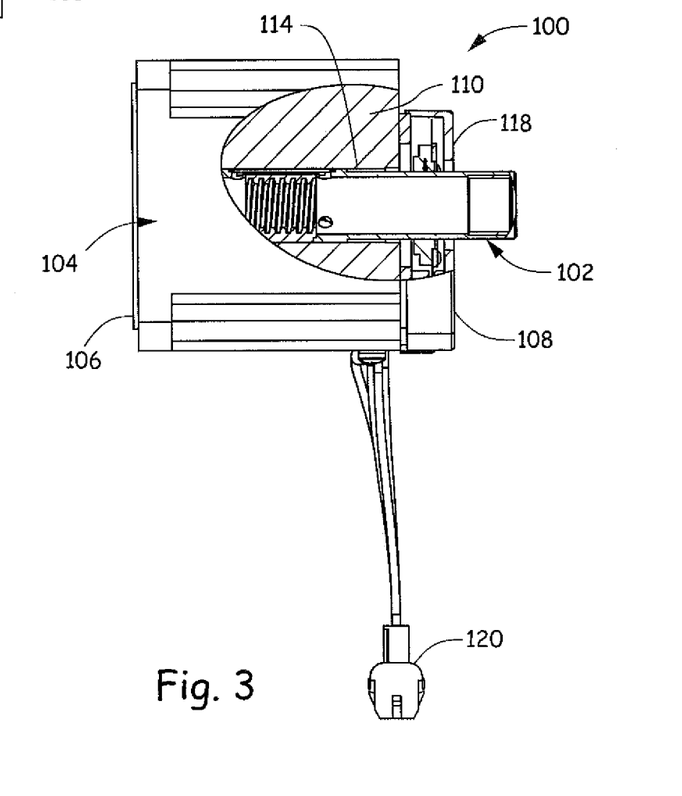
FIG. 3 is a partial section view of the portion of the linear motor illustrated in FIG. 2 taken through section line 3-3.

FIG. 2 is a perspective view of a portion of a linear motor or actuator 100 having lubricant flow control according to one embodiment. FIG. 3 is a partial section view of the portion of linear motor 100 illustrated in FIG. 2 taken through section line 3-3. The portion of linear motor 100 shown in FIGS. 2 and 3 includes a hollow, rotatable rotor 102. A leadscrew (not shown) would pass through the entirety of rotor 102. In one embodiment, linear motor 100 is electrically powered to rotate hollow rotor 102. The portion of linear motor 100 in FIGS. 2 and 3 includes a housing 104 with a first end 106 and a second opposing end 108, a rotor sleeve 110, hollow rotor 102 to which rotor sleeve 110 surrounds, an actuator nut 112, a first rotor guide bushing 114 and a second rotor guide bushing (not illustrated in FIG. 3). The portion of linear motor 100 shown in FIGS. 2 and 3 includes other components that will not be discussed in detail. These include, a rotary encoder 118 and electrical connector 120.

Figure 4:
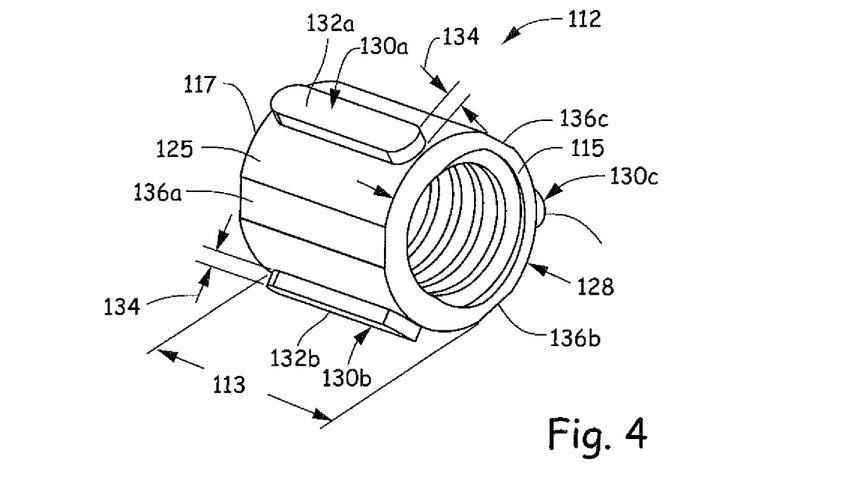
FIG. 4 is a perspective view of an actuator nut according to the embodiment illustrated in FIGS. 2 and 3.

FIG. 4 is a perspective view of actuator nut 112. As illustrated, actuator nut 112 includes a first open end 115, a second open end 117, a length 113 defined between first open end 115 and second end 117 and an outer diameter 128 defining an outer surface 125. Actuator nut 112 is internally threaded and further includes at least one elongated protrusion. In the embodiment illustrated in FIG. 4, actuator nut 112 has a plurality of elongated protrusions or three elongated protrusions 130a, 130b and 130c evenly spaced apart about outer diameter 128. Elongated protrusions 130a, 130b and 130c have lengths that are less than length 113 of actuator nut 112, protrude from outer surface 125 and terminate at end surfaces 132a, 132b and 132c, which are located a distance 134 from outer surface 125.

Actuator nut 112 further includes at least one planar surface on outer surface 125 that is substantially flat relative to round outer surface 125. More particularly and in the embodiment illustrated in FIG. 5, actuator nut 112 has a plurality of planar surfaces or three planar surfaces 136a, 136b and 136c that have lengths extending across the entire length 113 of actuator nut 112 or extending from first open end 115 to second open end 117. The planar surfaces 136a, 136b and 136c are evenly spaced apart around outer surface 125 and are each spaced apart from the three protrusions 130a, 130b and 130c. Each of the three planar surfaces 136a, 136b and 136c are located between two of the three protrusions 130a, 130b and 130c. In this configuration, each elongated protrusion is located along outer surface 125 of actuator nut 112 opposite from a planar surface. For example, protrusion 130a is located opposite from planar surface 136b, protrusion 130b is located opposite from planar surface 136c and protrusion 130c is located opposite from planar surface 136a.

Figure 5:
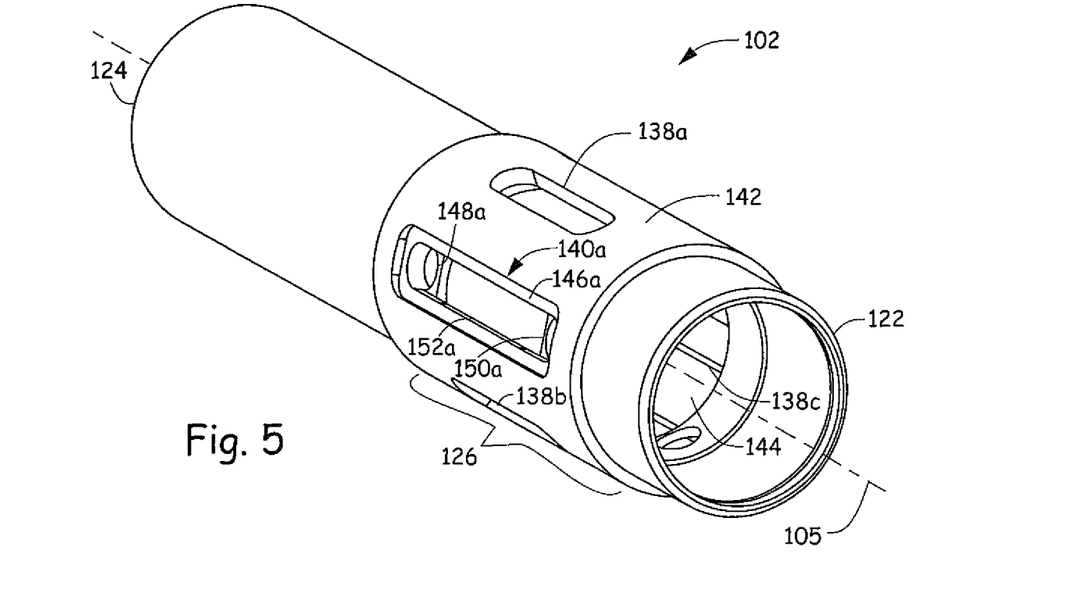
FIG. 5 is a perspective view of the rotor according to the embodiment illustrated in FIGS. 2 and 3.
Figure 6:
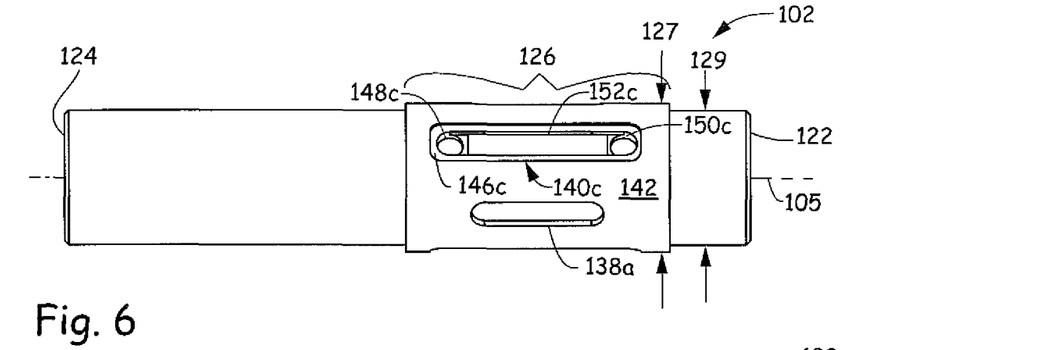
FIG. 6 is a top view of the rotor in FIG. 5.
Figure 7:
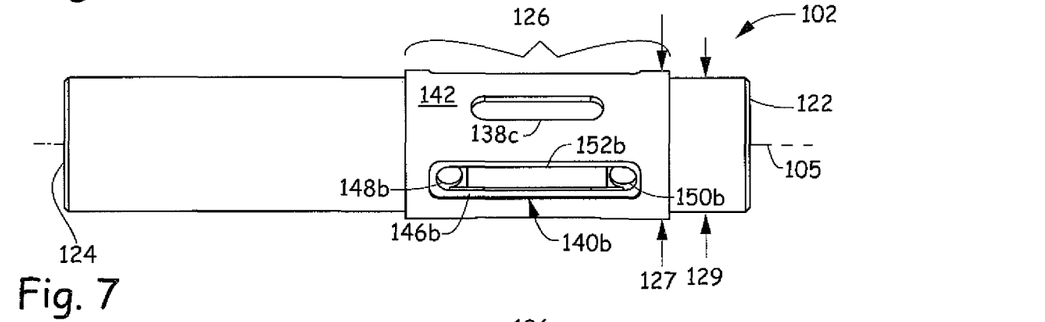
FIG. 7 is a bottom view of the rotor in FIG. 5.
Figure 8:
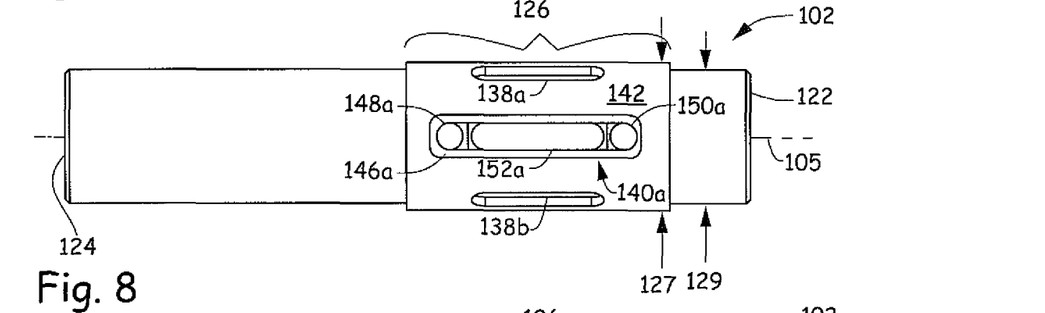
FIG. 8 is a left side view of the rotor in FIG. 5.
Figure 9:
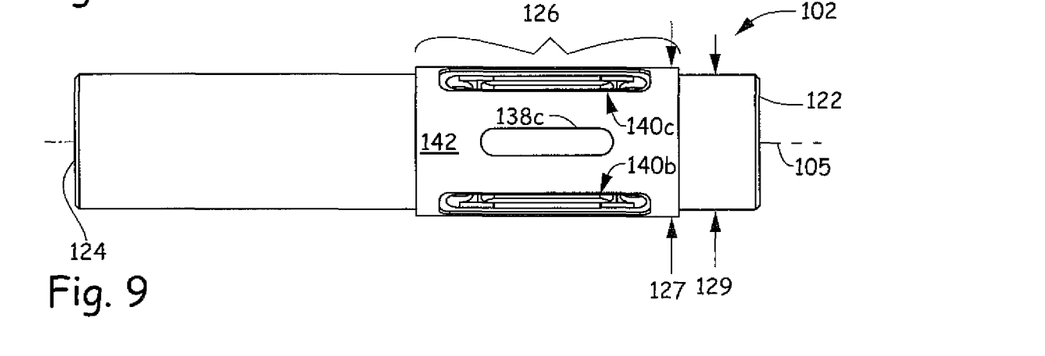
FIG. 9 is a right side view of the rotor in FIG. 5.

FIG. 5 is a perspective view of hollow rotor 102. FIG. 6 is a top view, FIG. 7 is a bottom view, FIG. 8 is a right side view and FIG. 9 is a left side view. Hollow rotor 102 includes a first open end 122, an opposing second open end 124 and extends along and is rotatable about a central axis 105. Between first open end 122 and second open end 124 is a mid-section 126. Mid-section 126 includes an outer diameter 127 that is larger than an outer diameter 129 of the remainder of rotor 102. Actuator nut 112 is positioned or housed within mid-section 126. Mid-section 126 is also where actuator nut 112 mates with hollow rotor 102. Actuator nut 112 rotates with hollow rotor 102 about central axis 105 as a traveling screw-type linear motor so that actuator nut 112 and rotor 102 together travel along a fixed leadscrew via the internal threads of actuator nut 112 riding along external thread of the leadscrew.

Mid-section 126 of rotor 102 includes at least one elongated slot and at least one bypass channel. In the embodiment illustrated in FIGS. 5-9, rotor 102 has a plurality of elongated slots, such as three elongated slots 138a, 138b and 138c, and a plurality of bypass channels, such as three bypass channels 140a, 140b and 140c. Elongated slots 138a, 138b and 138c extend entirely through mid-section 126 of rotor 102 from an outer surface 142 of mid-section 126 defined by outer diameter 127 to an inner surface 144 of mid-section 126. First bypass channel 140a, second bypass channel 140b and the third bypass channel 140c all have substantially similar features including each having a portion that is an opening that extends entirely through mid-section 126 from outer surface 142 of mid-section 126 to inner surface 144 of mid-section 126 or entirely through a thickness of rotor 102.

Each bypass channel 140a, 140b and 140c further includes a recessed portion, a first hole or port and a second hole or port. The recessed portion surrounds the first hole or port and the second hole or port and an elongated opening that is spaced apart from but positioned between the first port and the second port. In particular, bypass channel 140a includes recessed portion 146a, first hole or port 148a, second hole or port 150a and elongated opening 152a. Bypass channel 140b includes recessed portion 146b, first hole or port 148b, second hole or port 150b and elongated opening 152b. Third bypass channel 140c includes recessed portion 146c, first hole or port 148c, second hole or port 150c and elongated opening 152c. First hole 148a is spaced apart from and located proximate a first end of elongated opening 152a and second hole 150a is spaced apart from and located proximate an opposing second end of elongated opening 152a. First hole 148b is spaced apart from and located proximate a first end of elongated opening 152b and second hole 150b is spaced apart from and located proximate an opposing second end of elongated opening 152b. First hole 148c is spaced apart from and located proximate a first end of elongated opening 152c and second hole 150c is spaced apart from and located proximate an opposing second end of elongated opening 152c When assembled, actuator nut 112 is located and fixed inside a portion of mid-section 126 of rotor 102 by mating or engaging each of the plurality of protrusions 130a, 130b and 130c with one of the plurality of elongated slots 138a, 138b and 138c in rotor 102. With protrusions 130a, 130b and 130c of actuator nut 112 inserted into elongated slots 138a, 138b and 138c of rotor 102, each of the plurality of planar surfaces 136a, 136b and 136c is positioned adjacent to or proximate one of the plurality of bypass channels 140a, 140b and 140c.

Figure 10:
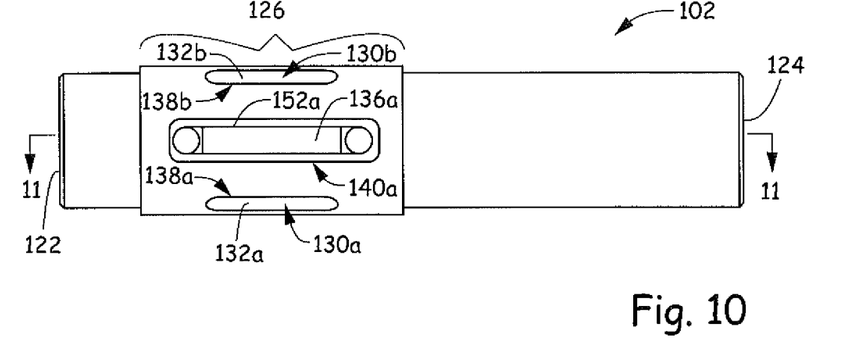
FIG. 10 is a side view of the rotor illustrated in FIGS. 5-9 containing the actuator nut illustrated in FIG. 4.

FIG. 10 is a side view of rotor 102 containing actuator nut 112. In particular, FIG. 10 illustrates actuator nut 112 mated with rotor 102 by having the plurality of protrusions of actuator nut 112 engaged with the elongated slots in mid-section 126 of rotor 102. As illustrated in FIG. 10, protrusion 136a of actuator nut 112 is engaged with elongated slot 138b of rotor 102 and protrusion 136b of actuator nut 112 is engaged with elongated slot 138b of rotor 102. Still further, planar surfaces are positioned adjacent to or proximate the elongated openings of the plurality of bypass channels. As illustrated in FIG. 10, planar surface 136a is visible through and adjacent to elongated opening 152a in bypass channel 140a.

Figure 11:
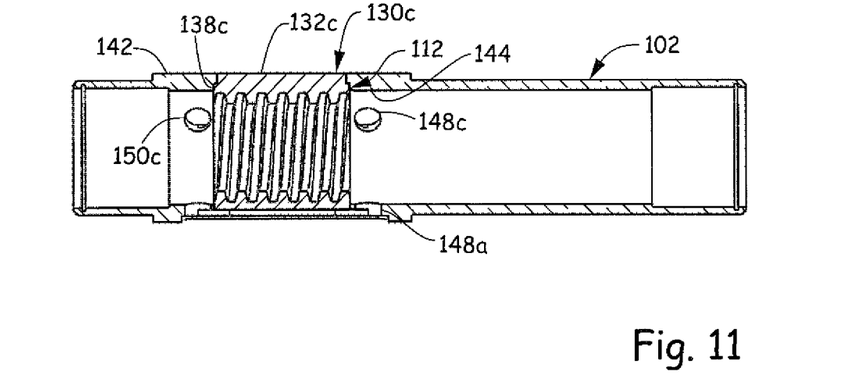
FIG. 11 is a section view of FIG. 10 taken through section line 11-11.
Figure 12:
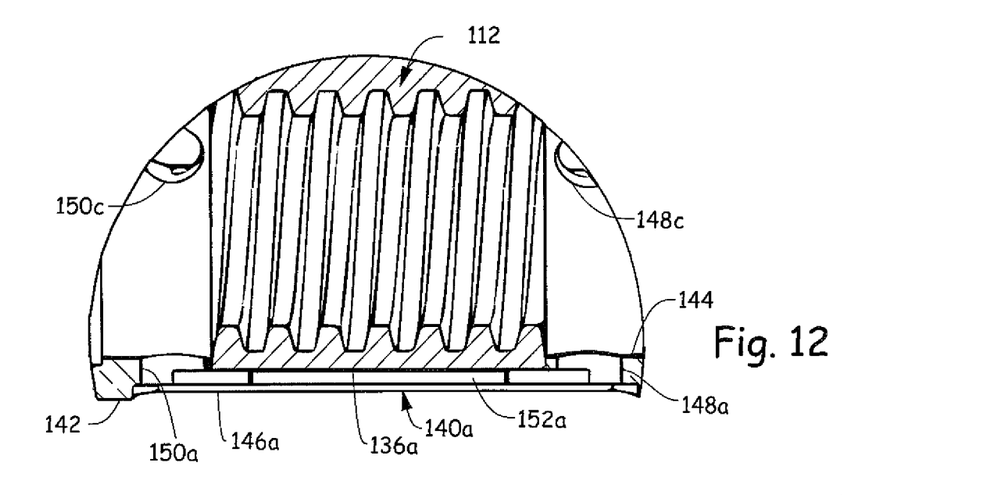
FIG. 12 is an enlarged view of a portion of FIG. 11.

FIG. 11 is a section view of FIG. 10 taken through section line 11-11 and FIG. 12 is an enlarged view of a portion of FIG. 11. As illustrated at the top in the section view, protrusion 130c of actuator nut 112 is engaged with elongated slot 138c of rotor 102. End surface 132c of protrusion 130c of actuator nut 112 is shown as being in alignment or even with outer surface 142 of mid-section 126 when mated with elongated slot 138c. Although not shown, each end surface of each protrusion engages with an elongated slot in a substantially similar same way. In other words, each end surface is in alignment or even with outer surface 142 of mid-section 126 and each protrusion is engaged with an elongated slot in mid-section 126 of rotor 102.

FIGS. 11 and 12 also show a section view of a bypass channel. In particular, recessed surface 146a of bypass channel 140a is recessed from outer surface 142 of mid-section 126. Holes or ports 148a and 150a of bypass channel 140a are in communication with recessed surface 146a on one end and in communication with inner surface 144 of mid-section 126 of rotor 102 at the other end. More specifically, holes or ports 148a and 150a extend between recessed surface 146a and inner surface 144 and are positioned on inner surface 144 on either side of actuator nut 112. Planar surface 136a is adjacent elongated opening 152a so as to create a channel or passage that runs from port 148a to port 150a and between planar surface 136a and outer surface 142 of mid-section 126. Although not shown, each bypass channel is recessed from outer surface 142, includes holes or ports and has an elongated opening that is adjacent to a planar surface on the actuator nut in a substantially similar same way.

Figure 13:
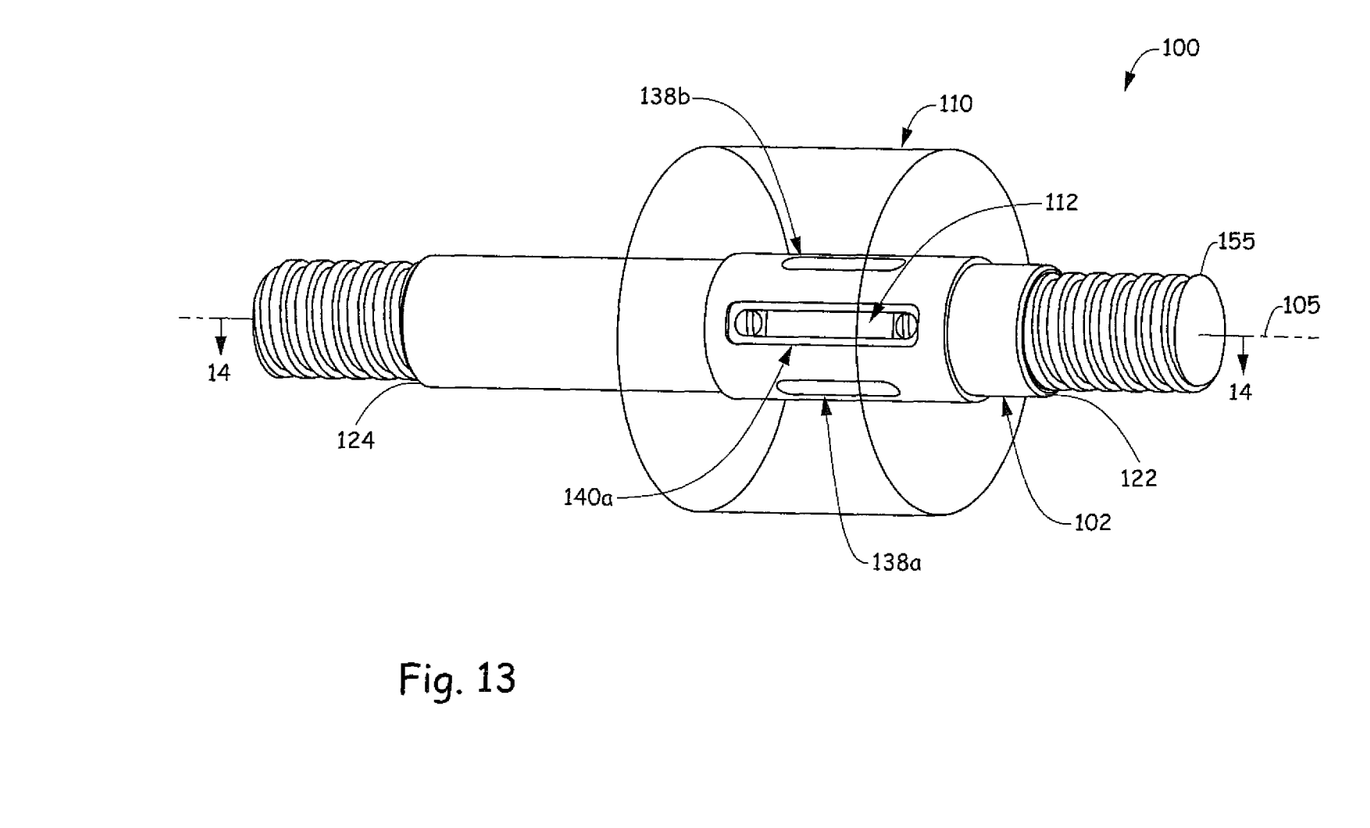
FIG. 13 is a perspective view of the rotor according to the embodiment illustrated in FIGS. 2 and 3, a lead screw and a surrounding rotor sleeve according to one embodiment.
Figure 14:
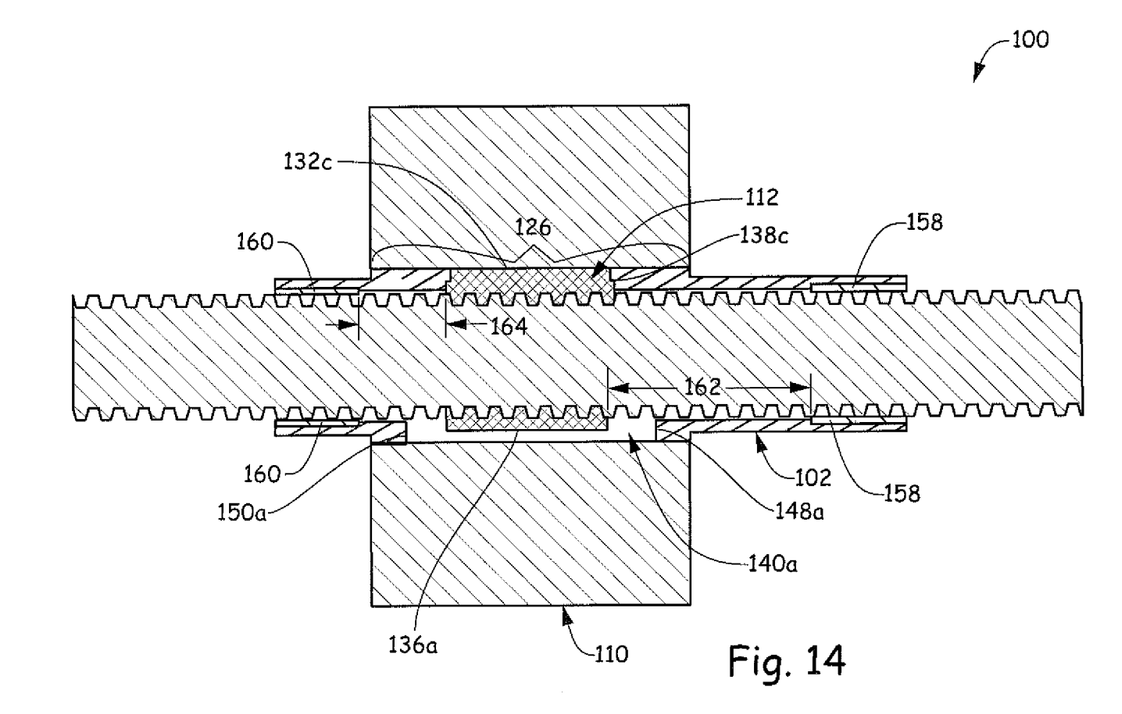
FIG. 14 is a section view of FIG. 13 taken through section line 14-14.
Figure 15:
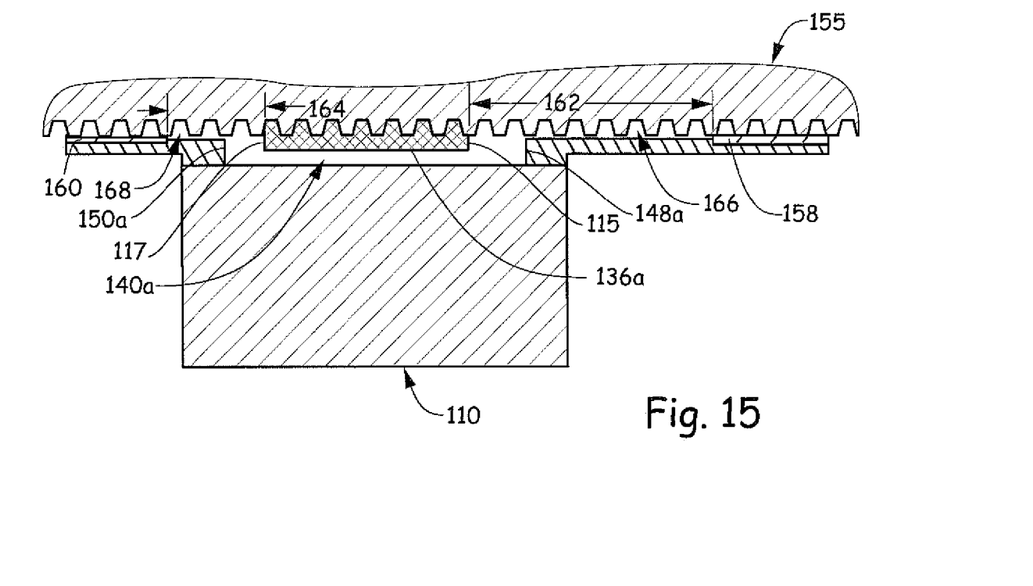
FIG. 15 is an enlarged view of a portion of FIG. 14.

FIG. 13 is a perspective view of linear motor 100 including rotor 102 containing actuator nut 112, a lead screw 155 that is externally threaded and a surrounding rotor sleeve 110 according to one embodiment. FIG. 14 is a section view of FIG. 13 taken through section line 14-14 and FIG. 15 is an enlarged view of a portion of FIG. 14. Leadscrew 155 extends through first open end 122 and second open end 124 of hollow rotor 102 and along central axis 105. Actuator nut 112 is positioned about leadscrew 155 and fixed within hollow rotor 102 and configured to ride along external threads of leadscrew 155. FIG. 13 is similar to FIG. 10 and FIG. 14 is similar to FIG. 11, but with lead screw 155 and rotor sleeve 110. In FIG. 14, end surface 132c is not only in alignment with outer surface 142 of mid-section 126, but end surface 132c like the other end surfaces of the protrusions of actuator nut 112 are adjacent to rotor sleeve 112. In FIGS. 14 and 15, bypass channel 140a that forms the channel or passage is not just defined by recessed surface 146a (FIG. 11), holes and ports 148a and 150a and elongated opening 152a (FIG. 11), but is also defined between planar surface 136a of actuator nut 112 and rotor sleeve 110.

As previously described, linear motor 100 further includes rotor guide bushings 158 and 160. In one embodiment, rotor guide bushing 158 and 160 are made of polyoxymethylene or acetal resin, such as the material manufactured under the trademark DELRIN from E.I. du Pont de Nemours and Company of Wilmington, Del. Rotor guide bushings 158 and 160 are set within internal bore of rotor 102 and in close proximity to the major diameter of leadscrew 155 so as to create a lubricant seal between rotor 102 and leadscrew 155. Bushing 158 is located a distance 162 from first end 115 of actuator nut 112 and bushing 160 is located a distance 164 from second end 117 of actuator nut 112. Between bushing 158 and first end 115 of actuator nut 112 forms a first chamber or cavity 166 and between bushing 160 and second end 117 of actuator nut 112 forms a second chamber or cavity 168. In the embodiment illustrated, the two chambers are connected to each other by the plurality of bypass channels or passages 140a, 140b and 140c that are formed into rotor 102. Although rotor 102 has three bypass channels, it should be realized that rotor 102 can include any number of bypass channels including a single bypass channel.

With no bypass channel, as actuator nut 112 rides along the external threads of leadscrew 155 and therefore rotating rotor 102, the close proximity of the internal threads of actuator nut 112 to the external threads of leadscrew 155 inhibits excess lubricant from the external threads of the lead screw from passing by. This buildup of lubricant on the leading edge of the actuator nut (whether that be first end 115 or second end 117 depending on the direction of travel of linear motor 100) is captured by the guide bushings and a high pressure zone is created in the leading chamber (whether that be first chamber 166 or second chamber 168 depending on direction of travel of linear motor 100). The pumping action of leadscrew 155 continually feeds the leading chamber during relative motion of leadscrew 155 to actuator nut 112.

The plurality of bypass channels or passages 140a, 140b and 140c provide a path for excess lubricant to travel from the leading chamber (one of first or second chamber 166 and 168) to the trailing chamber (the other of the first or second chamber 166 and 168) or a high pressure zone to a low pressure zone. The plurality of bypass channels 140a, 140b and 140c reduce friction caused by the viscosity of the lubricant. The trailing bushing (one of first or second bushings 158 and 160) serves to re-distribute the lubricant into the threads of leadscrew 155 after actuator nut 112 has passed.

The first holes or portions 148a, 148b and 148c in bypass channels 140a, 140b and 140c are each in communication with first chamber or cavity 166 and second holes or ports 150a, 150b and 150c in bypass channels 140a, 140b and 140c are in communication with second chamber or cavity 168. The holes or ports allow excess lubricant to travel from first chamber 166 to second chamber 168 if a high pressure zone is in first chamber 166 and a low pressure zone is in second chamber 168. If the high pressure zone is in second chamber 168 and the lower pressure zone is in the first chamber 166, then first holes 148a, 148b and 148c and second holes 150a, 150b and 150c allow excess lubricant to travel from second chamber 168 to first chamber 166.

Figure 16:
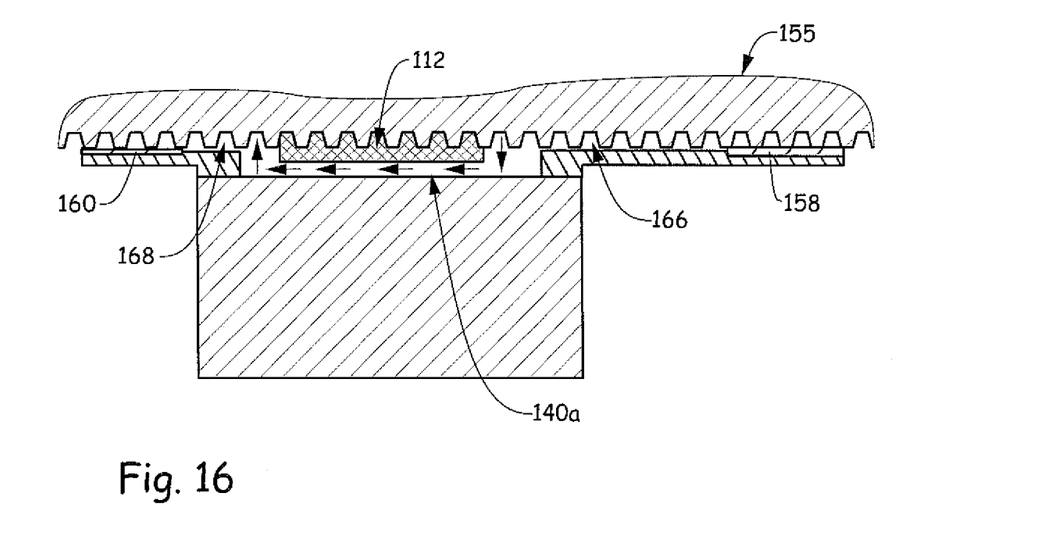
FIG. 16 illustrates the flow of lubricant in FIG. 15.

The assembly is made to allow the same functionality in both directions. However, FIG. 16 illustrates linear motor 100 traveling in a direction where first chamber 166 is the leading chamber and second chamber 168 is the trailing chamber. In other words, linear motor 100 and therefore actuator nut 112 is traveling along leadscrew 155 to the right. In this manner, first bushing 158 is the leading bushing and second bushing is the trailing bushing. Bypass channels 140a, 140b and 140c allow lubricant to flow (as illustrated by the arrows in FIG. 16) in a direction from leading chamber 166 to trailing chamber 168.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A linear motor comprising:
a hollow rotor rotatable about a central axis and rotatable relative to a surrounding rotor sleeve, wherein the hollow rotor includes a first open end, a second open end and at least one opening extending between an inner surface of the hollow rotor and an outer surface of the hollow rotor;
an externally threaded leadscrew extending through the first open end and the second open end of the hollow rotor and along the central axis;
an internally threaded nut having a first open end and a second open end and being located within and mated to the hollow rotor so as to rotate with the hollow rotor about the central axis, wherein the internally threaded nut is positioned about and configured to ride along the externally threaded leadscrew;
a first cavity located between the first open end of the internally threaded nut and a first bushing set against the inner surface of the rotor; and
a second cavity located between the second open end of the internally threaded nut and a second bushing set against the inner surface of the rotor; and
wherein the at least one opening in the hollow rotor forms a passage between the first cavity and the second cavity and the passage is defined between the sleeve and the internally threaded nut so as to cause excess lubricant to flow from a high pressure zone to a low pressure zone through the passage.

2. The linear motor of claim 1, wherein the internally threaded nut further comprises at least one elongated protrusion that extends from an outer surface of the internally threaded nut to an end surface.

3. The linear motor of claim 2, wherein the hollow rotor further comprises at least one elongated slot that extends between the inner surface of the hollow rotor and the outer surface of the hollow rotor, wherein the at least one elongated slot engages with the at least one elongated protrusion of the internally threaded nut so that the hollow rotor and the internally threaded nut are mated.

4. The linear motor of claim 2, wherein the internally threaded nut further comprises at least one planar surface on the outer surface that is substantially flat relative to the outer surface and extends from the first open end to the second open end of the internally threaded nut.

5. The linear motor of claim 4, wherein the at least one planar surface on the outer surface of the internally threaded nut opposes the at least one elongated protrusion that extends from the outer surface of the internally threaded nut.

6. The linear motor of claim 1, wherein the at least one opening that extends between an inner surface of the hollow rotor and an outer surface of the hollow rotor is located proximate to the at least one planar surface on the outer surface of the internally threaded nut so that the passage is defined between the sleeve and the at least one planar surface of the internally threaded nut.

7. The linear motor of claim 1, wherein the hollow rotor further comprises at least one first hole spaced apart from and located proximate a first end of the at least one opening and at least one second hole spaced apart from and located proximate a second end of the at least one opening, wherein the first holes is a port that communicates lubricant between the first cavity and the passage and the second hole is a port that communicates lubricant between the second cavity and the passage.

8. The linear motor of claim 1, wherein the linear motor comprises a traveling-nut linear actuator.

9. A linear motor comprising:
a rotor sleeve;
a rotor surrounded by the rotor sleeve and extending along and rotatable about a central axis, wherein the rotor includes an outer surface, an inner surface, a first open end and a second open end;
an externally threaded leadscrew extending through an inside of the rotor and along the central axis;
an actuator nut having a first open end and a second open end and being fixed to and contained within the inside of the rotor between the first open end and the second open end of the rotor, the actuator nut including internal threads that ride along the external threads of the leadscrew upon rotation of the rotor;
a first rotor guide bushing set against the inner surface of the rotor and creating a first lubricant seal between the rotor and the leadscrew, wherein the first rotor guide bushing is spaced apart from the first open end of the actuator nut by a distance that forms a first lubricant chamber;
a second rotor guide bushing set against the inner surface of the rotor and creating a second lubricant seal between the rotor and the leadscrew, wherein the second rotor guide bushing is spaced apart from the second open end of the actuator nut by a distance that forms a second lubricant chamber; and
at least one bypass channel located in the rotor and having a portion that extends through a thickness of the rotor, the at least one bypass channel being defined between the rotor sleeve and the actuator nut and including a first port that is in communication with the first lubricant chamber and a second port that is in communication with the second lubricant chamber so as to allow excess lubricant to travel from a high pressure zone in one of the first and second lubricant chambers to a low pressure zone in the other one of the first and second lubricant chambers.

10. The linear motor of claim 9, wherein the actuator nut further comprises at least one elongated protrusion that extends from an outer surface of the actuator nut to an end surface.

11. The linear motor of claim 10, wherein the rotor further comprises at least one elongated slot that extends between the inner surface of the rotor and the outer surface of the rotor, wherein the at least one elongated slot engages with the at least one elongated protrusion of the actuator nut so that the actuator nut is fixed to the rotor.

12. The linear motor of claim 10, wherein the actuator nut further comprises at least one planar surface on the outer surface that is substantially flat relative to the outer surface and extends from the first open end to the second open end of the actuator nut.

13. The linear motor of claim 12, wherein the at least one planar surface on the outer surface of the actuator nut opposes the at least one elongated protrusion that extends from the outer surface of the actuator nut.

14. The linear motor of claim 12, wherein the at least one bypass channel that extends through the thickness of the rotor is located proximate to the at least one planar surface on the outer surface of the actuator nut so that the at least one bypass channel is defined between the rotor sleeve and the at least one planar surface of the actuator nut.

15. The linear motor of claim 12, wherein the at least one bypass channel comprises three bypass channels that extend through the thickness of the rotor and the at least one planar surface on the outer surface of the actuator nut comprises three planar surfaces, wherein each bypass channel is located proximate to one of the planar surfaces on the outer surface of the actuator nut so that each bypass channel is defined between the rotor sleeve and one of the planar surfaces of the actuator nut.

16. The linear motor of claim 9, wherein the linear motor comprises a traveling-nut linear actuator.

17. A method of reducing friction caused by the viscosity of lubricant in a linear motor, the method comprising:
electrically powering a linear motor to rotate a rotor that surrounds an internally threaded nut that fixedly mates with the rotor, wherein by rotating the rotor the internally threaded nut rides on an externally threaded leadscrew that extends along a central axis through the internally threaded nut and the rotatable rotor; and
communicating lubricant between a first chamber in the rotor that is defined between a first bushing located and sealed proximate a first open end of the rotor and a first end of the internally threaded nut and a second chamber in the rotor that is defined between a second bushing located and sealed proximate a second end of the internally threaded nut using at least one bypass channel extending through a thickness of the rotor and defined between a sleeve surrounding the rotor and an outer surface of the internally threaded nut.

18. The method of claim 17, wherein communicating lubricant comprises allowing excess lubricant using the at least one bypass channel to travel from a high pressure zone to a low pressure zone.

19. The method of claim 17, wherein lubricant is communicated between the first chamber and the second chamber through a first port and a second port in the at least one bypass channel.

20. The method of claim 17, wherein the internally threaded nut fixedly mates with the rotor with at least one protrusion that extends from an outer surface of the internally threaded nut, terminates at an end surface and engages with an elongated slot in the rotor.

* * * * *

UNITED STATES PATENT AND TRADEMARK OFFICE
CERTIFICATE OF CORRECTION

| | | |
|---|---|---|
| PATENT NO. | : 9,893,591 B2 | Page 1 of 1 |
| APPLICATION NO. | : 14/955875 | |
| DATED | : February 13, 2018 | |
| INVENTOR(S) | : Farley et al. | |

It is certified that error appears in the above-identified patent and that said Letters Patent is hereby corrected as shown below:

On the Title Page

(57) ABSTRACT
In line ten of the fifth sentence, after "between", insert --the--.

In the Claims

Column 11, Line 13, delete "holes", insert --hole--.

Signed and Sealed this
Thirtieth Day of July, 2019

Andrei Iancu
*Director of the United States Patent and Trademark Office*